Figure 1:
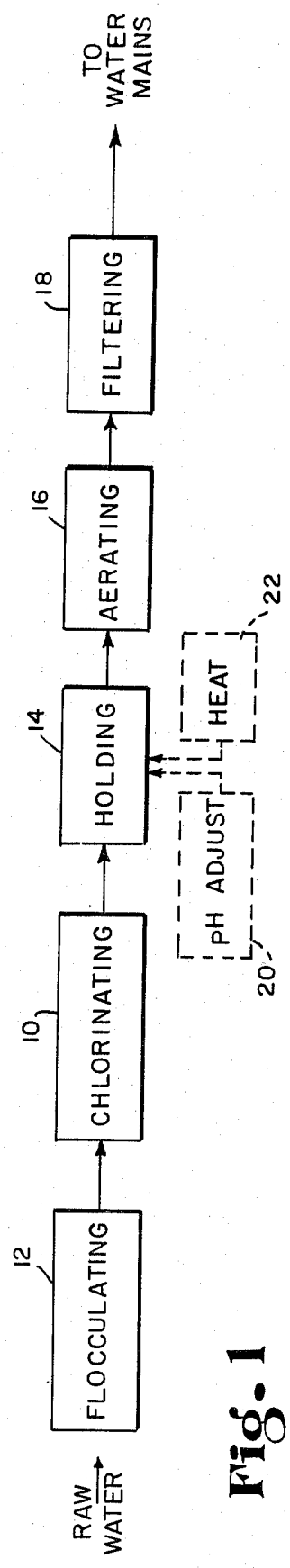

United States Patent [19]

Dunn et al.

[11] 4,314,906
[45] Feb. 9, 1982

[54] WATER PURIFICATION BY CHLORINATING, HOLDING, AND AERATING

[75] Inventors: Howard E. Dunn, Mount Vernon; Robert L. Koch, II, Evansville, both of Ind.

[73] Assignee: George Koch Sons, Inc., Evansville, Ind.

[21] Appl. No.: 235,017

[22] Filed: Feb. 17, 1981

Related U.S. Application Data

[63] Continuation of Ser. No. 91,089, Nov. 5, 1979, abandoned, which is a continuation-in-part of Ser. No. 712,872, Aug. 9, 1976, abandoned, which is a continuation-in-part of Ser. No. 634,901, Nov. 24, 1975, abandoned.

[51] Int. Cl.³ .............................................. C02F 1/76
[52] U.S. Cl. .................................. 210/754; 210/694; 210/764; 210/908
[58] Field of Search .................... 55/53; 210/631, 668, 210/669, 702, 718, 721, 749, 750, 754–756, 758, 764, 908

[56] References Cited

U.S. PATENT DOCUMENTS

| | | | |
|---|---|---|---|
| 1,229,305 | 6/1917 | Menzies | 210/752 |
| 1,771,518 | 7/1930 | Adler et al. | 210/752 |
| 1,805,353 | 5/1931 | Berl | 210/668 |
| 2,452,970 | 11/1948 | Vincent et al. | 210/667 |
| 3,337,454 | 8/1967 | Gruen et al. | 210/667 |
| 3,732,164 | 5/1973 | Pressley et al. | 210/752 |
| 3,733,266 | 5/1973 | Bishop et al. | 210/668 |
| 4,243,525 | 1/1981 | Greenberg | 210/759 |

OTHER PUBLICATIONS

Rook, "Formation of Haloforms During Chlorination of Natural Waters,", J. Water Treatment Exam., 1974, pp. 234–243.
Betz Handbook, 7th Ed., 1976, pp. 21–23.
Rook, "Haloforms in Drinking Water", JAWWA, Mar. 1976, pp. 168–172.
Linsley et al., Water Resources Eng., McGraw-Hill, 1964, pp. 452–454.
Sawyer, "New Water Treatment Plant, Poughkeepsie, N.Y.", Apr. 10, 1962, pp. 1–12.

Primary Examiner—Peter A. Hruskoci
Attorney, Agent, or Firm—Jenkins, Coffey, Hyland, Badger & Conard

[57] ABSTRACT

A method of preparing water for human consumption by chlorinating water obtained from reservoirs, lakes, or streams, which water contains microorganisms and naturally occurring or pollutant organic precursor substances known to react with chlorine to yield one or more halogenated organic compounds, holding the chlorinated water for a period of time sufficient for the chlorine to react with said precursors to produce halogenated organic compounds, and then removing the halogenated organic compounds from the water by aeration. Such treatment also removes any bromine-containing organic compounds contained in the water and any chlorine derivatives thereof formed in the chlorine treatment.

10 Claims, 3 Drawing Figures

WATER PURIFICATION BY CHLORINATING, HOLDING, AND AERATING

This application is a continuation of U.S. application Ser. No. 091,089, filed Nov. 5, 1979, and abandoned upon the filing of this application, which in turn was a continuation-in-part of U.S. application Ser. No. 712,872, filed Aug. 9, 1976, previously abandoned, which in turn was a continuation-in-part of U.S. application Ser. No. 634,901, filed Nov. 24, 1975, previously abandoned.

The present invention relates to drinking water treatment, and particularly to the provision of a method for treating raw water containing microorganisms and certain chemical precursors, comprising the steps of chlorinating the water to kill the microorganisms, permitting the chlorine to react with the precursors, and then aerating the water to remove the chlorine derivatives of the precursors. Importantly, the present invention provides a method for treating water to make it fit and safe for human consumption.

Aeration of water in water treatment plants is known for the purpose of killing pathogens in the water. Prior patents also teach the use of ozone and even pure oxygen in the water, and particularly in waste water, to purify it. Examples of prior art applications of air, oxygen, and ozone are disclosed in U.S. patents as follows: U.S. Pat. Nos. 782,021; 2,417,722; 2,527,444; 3,017,951; 3,650,950; 3,660,277; 3,682,314; 3,732,163; 3,755,142; 3,772,188; 3,856,673; and 3,872,003. In the parent application Ser. No. 634,901, the Examiner cited U.S. Pat. Nos. 1,229,305; 1,771,518; 1,805,353; 2,452,971; 3,732,164; and 3,733,266. The two U.S. Pat. Nos. 3,733,266 and 3,732,164 directed to waste water treatment were considered by the Examiner to be the most pertinent. These waste water treatment patents teach extremely high level chlorination (120–200 p.p.m. of chlorine) as compared to the conventional chlorination levels for treatment of drinking water, 2–20 p.p.m., and usually 4–8 p.p.m.

In the first C.I.P. application Ser. No. 712,872, the Examiner additionally cited U.S. Pat. Nos. 2,452,970 and 3,337,454 and textual material, Linsley et al., *Water Resources Engineering*, 452–54, (McGraw-Hill 1964).

The present invention is directed toward the treatment of raw water from reservoirs or lakes, or particularly from streams, before it is subjected to treatment of any kind other than flocculation and/or filtration to remove particulate matter therefrom. Such water contains microorganisms of many kinds, usually including pathogenic bacteria, fungi, and viruses, which are commonly destroyed by adding chlorine in a known manner. The water also contains chemical substances of varied and undetermined structure, partly of natural origin and partly introduced as pollutants in the form of industrial wastes, which are known to react with chlorine during conventional chlorination treatment to produce chlorinated derivatives such as chloro alkanes, chloro keto alkanes, chloro hydroxy alkanes, chloro alkyl ethers, and others. In some cases, the precursor chemical substances in the raw water also contain chemically bound bromine, usually of industrial origin, which can be removed in accordance with the present invention either as such or as chlorine-containing derivatives thereof of the classes referred to above.

The chlorinated derivatives referred to above, resulting from the chlorination of raw water, are largely derivatives of methane and ethane, although lesser quantities of propane and higher alkane derivatives are occasionally found. Thus, in the terms "alkane" and "alkyl" used above, reference is made to the $C_1$ to $C_3$ substances (methanes, ethanes, and propanes) of which the $C_1$ to $C_2$ substances are the principal subgroup and the $C_1$ substances are the principal individual components. The brominated substances and chlorobrominated derivatives fall into the same groups with respect to "alkane" and "alkyl." All of the chlorinated, brominated, and chlorobrominated substances thus defined are referred to herein for convenience as "halogenated organic compounds."

Examples of the halogenated organic compounds with which the present invention is concerned are as follows:

| Halogenated Compound | Chemical Designation | Molecular Weight | Boiling Point |
| --- | --- | --- | --- |
| Chloroform | $CHCl_3$ | 119.39 | 61.2° C. |
| Chlorodibromomethane | $CHClBr_2$ | 208.31 | 120 |
| Carbon tetrachloride | $CCl_4$ | 153.84 | 76.8 |
| Dichlorobromomethane | $CHBrCl_2$ | 163.85 | 90.1 |
| Dichloromethane | $CH_2Cl_2$ | 84.94 | 40.2 |
| 1,2-Dichloroethane | $ClCH_2CH_2Cl$ | 98.97 | 83.5 |
| Bromoform | $CHBr_3$ | 252.77 | 149.6 |
| 1,1,1-Trichloroethane | $Cl_3CCH_3$ | 133.41 | 74.1 |
| Chloroacetone | $ClCH_2COCH_3$ | 92.53 | 119 |
| Chloromethyl ether | $ClCH_2-O-CH_2Cl$ | 114.96 | 104 |
| 2-Chloroethyl ether | $ClC_2H_4-O-C_2H_4Cl$ | 143.02 | 178 |
| 1,3-Dichloroacetone | $ClCH_2COCH_2Cl$ | 126.97 | 173.4 |
| 2-Chloroisopropyl ether | $ClCH_2-\underset{\underset{CH_3}{\mid}}{CH}-O-\underset{\underset{CH_3}{\mid}}{CH}-CH_2Cl$ | 171.07 | 187 |
| Ethylene Chlorhydrin | $ClCH_2CH_2OH$ | 80.52 | 128 |

In this description, and in the appended claims, the term "organic chemical precursors" is intended to refer to the organic chemical or chemicals in raw water that react with chlorine during chlorine treatment in water purification plants to produce halogenated organic compounds. Examples of such naturally occurring air pollutant organic substances include methane (as disclosed in U.S. Pat. No. 2,527,444), methanol, ethanol, acetone, methyl ethyl ketone, and the like. Raw water tends to include a wide variety of such precursor substances, owing to its contact with living and decaying vegetation (humic matter) and animal matter, which are continuously being converted into a large number of organic breakdown products owing to the action of the many enzyme systems contained therein. The identities and proportions of these substances are not a part of the present invention, since it is well established that they are converted during chlorination to the halogenated organic substances whose removal is the object of the invention.

It is now believed that chloroform and the chloro alkyl ethers are carcinogenic, and other halogenated organic substances are also under suspicion. It is established that such substances are generated in raw water during chlorine treatment. But chlorine treatment is the most economical and widely used method of controlling microorganisms in converting raw water into potable water for human consumption. It is therefore important to provide means for removing halogenated organic substances from water delivered to the consumer.

The present invention, therefore, provides a water treatment method for use in municipal water systems which are supplying water including halogenated compounds. The method of the present invention includes a step of holding the water after the chlorine is added for a period of time sufficient for the chlorine to react with the chemical precursors to produce halogenated organic compounds. Tests have been performed that show that the halogenated compounds continue to form over a period of time ranging up to 72 hours or even 100 hours or more after chlorination, the exact rate of formation being dependent upon the concentration of the precursor, the pH of the water, the temperature of the water, and, of course, the concentration of the chlorine used. The method of the present invention, therefore, includes the step of holding the chlorinated water for a period of $\frac{1}{4}$ to 100 hours or more, preferably from about 3 to about 12 hours, sufficient for the chlorine to react with the precursors to produce the halogenated organic compounds. The method also includes the step of removing the halogenated organic compounds after they have formed, and the removing step may include aeration or a combination of aeration and filtration. It has been found that the halogenated organic compounds can be effectively removed by aeration. Such compounds can also be effectively removed by treatment with activated carbon. Aeration, however, is much less expensive to use for removing the halogenated organic compounds than activated carbon. Thus, in accordance with the present invention, activated carbon filtration may be used on a limited basis as a sort of final step to remove any substances not removed by aeration, as well as to improve the taste of the water. If the raw water does include such suspected carcinogenic materials as 2-chloroisopropyl ether and 2-chloroethyl ether, it may be advisable to pass the water through activated carbon, which is known to adsorb such ethers. The activated carbon filtering may involve simply passing the water through an activated carbon bed or dumping powdered activated carbon into the water and then subsequently filtering out the carbon. Both such carbon filtering techniques are known.

The aeration step of the present invention preferably involves passing a volume of air at least ten times greater than the volume of the water and, perhaps, between ten and one hundred times greater than the volume of the water, through the water at such a rate as to cause substantial turbulence of the water. It is believed that the air "sweeps out" the halogenated compounds, in effect carrying out a kind of steam distillation. The "sweeping out" theory is substantiated by the fact that an inert gas such as helium or nitrogen will, when blown through the water, remove the halogenated compounds. Thus, such gases are the equivalent of air in the present invention, although it will be apparent that they cannot complete economically with air. It is desirable, of course, that the air or gas passed through the water be itself clean and free of contamination.

It has been proven that aeration of water prior to chlorination will not be effective to remove the precursor substances. Laboratory tests have established that the precursors cannot be removed by inert gas stripping. In laboratory tests, the precursors could not be removed by helium stripping. When chlorine was added to the helium-stripped raw water sample, halogenated compounds were formed. Thus, for maximum effectiveness, the aeration technique is preferably carried out after at least a substantial proportion of the precursors have been reacted with the chlorine to form halogenated organic compounds. For this reason, past aeration techniques to remove pathogens prior to chlorination would not be effective to remove any of the chemical precursors. Nor would a simple sequence of chlorination and aeration, as in Gruenwald U.S. Pat. No. 3,337,454, be effective to avoid the problem of the chlorinated derivatives of the chemical precursors. In the absence of the holding period of the present invention (which is not even suggested as a part of the Gruenwald process), Gruenwald's aeration would leave a large proportion of the chemical precursors unchanged in the water, ready for reaction upon further addition of chlorine (as would have to be done before supplying the water to the water mains). There would follow an extended holding period in the water mains, leading to the objectionable chlorinated organic substances, but without an aeration step to remove them as in the present invention.

Other objects and features of the present invention will become apparent as this description progresses.

Figure 2:
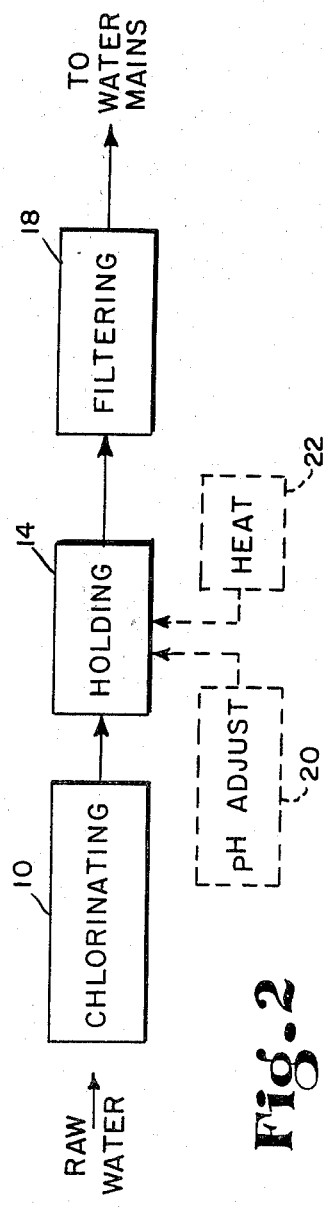
Figure 3:
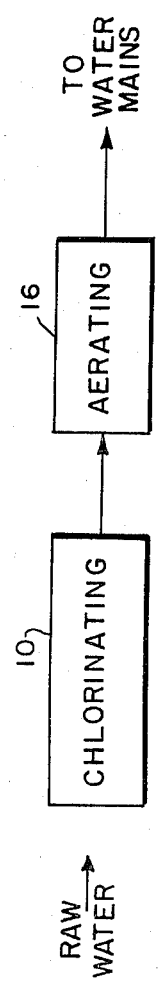

In the drawings:

FIGS. 1–3 are diagrammatic views showing the steps of the present invention.

Referring particularly to the drawings, it will be seen that the chlorinating step is indicated at 10 and that it is the first step of the method of the present invention, recognizing that a flocculating step 12 and other such steps may well occur in advance of the chlorinating step to accommodate the systems of established municipal water works companies. The chlorine is added in amounts sufficient to produce, for instance, a chlorine residual of 1 to 2 p.p.m., preferably 1.2 to 1.8 p.p.m. The charge of chlorine necessary to obtain such residual levels depends, of course, on the chlorine demand, but may be expected to be in the range of 5 to 8 p.p.m. It is believed that most municipal water treatment plants add from 2 to 20 p.p.m. chlorine, and the method of the present invention contemplates such a range.

The holding step, aerating step, and optional filtering step are indicated, respectively, by the reference numerals 14, 16, and 18. Adjustment of pH is indicated at 20 and optional heating is indicated at 22.

The system of FIG. 1 contemplates that the flocculated water will be chlorinated to kill the pathogens contained in the water and to react the precursors with the chlorine. The length of time the chlorinated water will be held may range, for instance, between about 6 and about 12 hours or more depending upon the concentration of the chlorine, the concentration of the precursors, the temperature of the water, the pH of the water, and other such variables. For instance, if ketones are among the precursors, they will react faster with chlorine to form the halogenated compounds in a water having a higher pH. Since water systems conventionally keep the pH of the water from approximately 7.5 to 9, the reaction of the chlorine and the precursors can be speeded up by keeping the pH of the water at the higher end of the conventional range, for instance, between 8.5 and 9. This careful control of the pH level at the higher end of the conventional water treatment scale with, perhaps, some heating of the water and irradiating the water with actinic light, may reduce the holding time to a significantly lower level. It is contemplated, for instance, that holding tanks could be provided and heated with solar heating systems rather economically. It is presently believed that chlorine will react with the precursors throughout the temperature range in which water is a liquid, increasing somewhat in rate with higher temperatures, while the most practical and economical range would be from about 10° C. to about 50° C.

After the halogenated compounds are formed, they are removed, in accordance with the present invention, by aerating the water or filtering the water or a combination of aerating and filtering. From an economic standpoint, aerating the water is significantly less expensive than filtering using activated carbon. Thus, a method using aeration to remove most of the halogenated compounds and then, perhaps, some activated carbon filtering to remove the balance of the compounds and to improve the taste of the water may be the most practical. FIG. 2 shows an alternative method involving taking the water directly from the holding step to a filtering step.

Finally, FIG. 3 shows a method involving chlorinating the water and then aerating.

The aerating may preferably involve blowing relatively large volumes of air through the water, and preferably upwardly through the water to sweep out or carry off the halogenated compounds contained in the water. It is presently believed that a volume of air ten to one hundred times greater than the volume of the water and moving through the water at a rate sufficient to cause substantial turbulence will be sufficient for the purpose of sweeping out the halogenated compounds.

Quite possibly, the aerating can occur in the same containers in which the holding occurs. It will be appreciated, however, that the holding step as well as the aerating step does not have to occur in a static situation. That is, it is not necessary to hold the water in a large tank for a specific period of time. The reaction of the chlorine with the precursors may occur at a sufficient rate to permit the water to be moved slowly through a reaction chamber or series of passageways. The aeration step may also be carried out by spraying the water into a tower countercurrent to an upwardly moving stream of air.

The following seven examples are submitted to establish the effectiveness of (1) nitrogen stripping; (2) holding; (3) holding and stripping; (4) activated carbon filtering; (5) helium stripping; (6) air stripping in a tower; and (7) air stripping in a flume.

EXAMPLE 1

Holding and Aeration for Removal of Halogenated Organic Compounds From Drinking Water A 1-gallon sample of chlorinated drinking water was collected from a municipal water plant and allowed to stand for 24 hours. A baked-out liter bottle was filled to overflowing from the 1-gallon container and very carefully capped to avoid head space. Another 1500 ml. portion of the original 1-gallon sample was poured into a baked-out ½ gallon glass container. This sample was "aerated" by passing nitrogen through the sample at 15 ft$^3$/hour for 20 minutes. The "aerated" and non-aerated samples were then analyzed for chloroform, bromodichloromethane, and dibromochloromethane. The "aerated" sample was found to contain 94% less chloroform, 97% less dichlorobromomethane, and 97% less chlorodibromomethane. This method is also very effective in the removal of methylene chloride (dichloromethane), carbon tetrachloride, 1,2-dichloroethane, and bromoform from water.

EXAMPLE 2

Rate of Formation of Halogenated Compounds in Drinking Water

A water sample was collected from a municipal water plant approximately one hour after the chlorine had been added. The sample was collected in a baked-out 1-liter glass bottle filled to overflowing and capped to eliminate head space. 10-milliliter aliquots were taken periodically and analyzed for chloroform over a period of 73 hours. Marbles were added to the bottle to eliminate the head space produced by taking the aliquot. The chloroform concentration was found to increase with time. About 50% of the maximum chloroform concentration was attained after 2½ hours, 60% after 3½ hours, 70% after 5¾ hours, 80% after 10 hours, and 90% after 21 hours.

EXAMPLE 3

Holding and Aeration for Chloroform Removal from Drinking Water

A water sample was collected from a municipal water plant approximately four hours after the water had been chlorinated. The sample was collected in a baked-out glass bottle filled to overflowing and capped to eliminate head space. The pH was found to be 8.0 and the chlorine content 1.6 p.p.m. The sample was allowed to stand at room temperature and was periodically analyzed for chloroform over a period of 73 hours. As in Example 2, the chloroform concentration increased with time. About 60% of the maximum chloroform concentration was attained after 3 hours, measured from the time of chlorination, 80% after 25 hours, 95% after 50 hours, and 96% after 73 hours. At the end of 73 hours, the sample was aerated by passing nitrogen gas through the sample at the rate of 15 ft$^3$/hour for 33 minutes. The sample was again analyzed for chloroform and was found to contain 95% less than before aeration.

EXAMPLE 4

Activated Carbon Removal of Organics From Drinking Water

Finished drinking water was passed through a fresh commercial filter at the rate of 1.7 gallons per minute. The filter cartridge contained 35 cubic inches of premium quality hard granular activated carbon and was fitted with a 5 micron pre and post filter. The finished drinking water that had passed through the carbon filter contained 87% less chloroform than the water entering the carbon filter.

EXAMPLE 5

Helium Stripping of Organic Compounds From Drinking Water

Into a centrifuge tube was placed 10 ml. of a water sample containing $CH_2Cl_2$, $CCl_4$, $CHCl_3$, $ClCH_2CH_2Cl$, $CHClBr_2$, $CHBrCl_2$, and $CHBr_3$ with concentrations ranging from 10 to 100 micrograms/liter. Helium gas was bubbled through the solution at the rate of 80 ml/min. for 8 minutes. This method removed 100% of the $CH_2Cl_2$ and $CCl_4$ and more than 95% of each of the other mentioned compounds.

EXAMPLE 6

Chlorination, Holding, and Column Aeration

Water having a total suspended solids content of 91 micrograms/liter and a turbidity of 65 NTU turbidity units is withdrawn from a raw water source at ambient temperature, 22° C., and subjected to conventional flocculation, settling, and filtration treatments. Thereafter, it is chlorinated to a level of 2 p.p.m. chlorine residual and conveyed through a holding tank, where it has a mean residence time of 3 hours, into the top of aeration column having a height of 50 feet and a diameter of 20 feet. It flows downward through the column at a rate of 706,880 gallons per hour past a stream of air bubbles introduced through a sparger pipe at the bottom of the column, at a flow rate of 7,200,000 ft$^3$ per hour, STP. The aeration carries away dissolved chloro and bromo compounds from the water as well as the residual chlorine. The aerated water flowing from the bottom is rechlorinated to a level of 1 p.p.m. chlorine residual and is conveyed to finished water storage and distribution lines.

EXAMPLE 7

Chlorination, Holding, and Flume Aeration

Raw water as in Example 6 is subjected to flocculation, settling, filtration, and chlorination as in Example 6, after which it is held in a storage tank for 4 hours. Thereafter, it is conveyed through an open concrete flume, rectangular in cross section, with sparger pipes positioned at the bottom and extending along its entire length. The flume has a vertical height of 10 feet, a width of 10 feet, and a length of 100 feet. The chlorine-containing water flows through the flume at a rate of 450,000 gallons per hour and is exposed to a stream of air bubbles introduced through the sparger pipe at a total rate of 4,500,000 ft$^3$ per hour, STP. At the lower end of the flume, the aerated water flows over a weir, from which it is collected and rechlorinated to a level of 1 p.p.m. chlorine residual, and is conveyed to finished water storage and distribution lines.

We claim:

1. A method for treating raw water from reservoirs, lakes, or streams to render it fit for human consumption, the said water containing microorganisms and naturally occurring organic substances known to react with chlorine to yield one or more halogenated organic compounds, which method comprises the steps of adding from about 2 to about 20 p.p.m. of chlorine to the water to kill said microorganisms, holding the chlorine-containing water at a temperature between about 10° and about 50° C. and a pH between about 7.5 and about 9 for a period of at least about 3 hours, to react said chlorine with said naturally occurring organic substances and produce said halogenated organic compounds, and thereafter aerating the chlorine-treated water, to remove said halogenated organic compounds therefrom.

2. The method of claim 1 in which the aeration step is carried out by spraying the water into a column countercurrent to an upwardly moving current of air.

3. The method of claim 1 in which the aeration step is carried out by flowing a body of the water downward through a column countercurrent to a stream of air bubbles.

4. The method of claim 1 in which the aeration step is carried out by sparging a flowing stream of the water with air.

5. The method of claim 1 in which the concentration of added chlorine is from about 4 to about 8 p.p.m.

6. The method of claim 1 in which the aeration step includes passing air through a body of the chlorinated water in a proportion at least 10 times the volume of water at such a rate as to cause substantial turbulence of the water.

7. A method for treating raw water from reservoirs, lakes, or streams to render it fit for human consumption, the said water containing microorganisms and naturally occurring organic substances known to react with chlorine to yield one or more halogenated organic compounds, which method comprises the steps of adding from about 4 to about 8 p.p.m. of chlorine to the water to kill said microorganisms, holding the chlorine-containing water at a temperature between about 25° and about 50° C. and a pH between about 8.5 and about 9 for a period of about 3 to about 12 hours, to react said chlorine with said naturally occurring organic substances and produce said halogenated organic compounds, and thereafter passing air through a turbulent body of said water until said halogenated organic compounds are volatilized therefrom.

8. A method for treating raw water from reservoirs, lakes, or streams to render it fit for human consumption, the said water containing microorganisms and naturally occurring organic substances known to react with chlorine to yield one or more halogenated organic compounds, which method comprises the steps of adding from about 4 to about 8 p.p.m. of chlorine to the water to kill said microorganisms, holding the chlorine-containing water at a temperature between about 10° and about 50° C. and a pH between about 8.5 and about 9 for a period of about 3 to about 12 hours, to react said chlorine with said naturally occurring organic substances and produce said halogenated organic compounds, and thereafter passing air through a turbulent body of said water until said halogenated organic compounds are volatilized therefrom.

9. A method for treating raw water from reservoirs, lakes, or streams to render it fit for human consumption, the said water containing microorganisms and naturally occurring organic substances known to react with chlorine to yield one or more halogenated organic compounds, which method comprises the steps of subjecting the raw water to treatment to remove particulate matter therefrom prior to adding chlorine, adding from about 2 about 20 p.p.m. of chlorine to the water to kill said microorganisms, holding the chlorine-containing water at a temperature between about 10° and about 50° C. and a pH between about 7.5 and about 9 for a period of at least about 3 hours, to react said chlorine with said naturally occurring organic substances and produce said halogenated organic compounds, and thereafter subjecting the chlorine-treated water to aeration sufficient to remove said halogenated organic compounds therefrom.

10. A method for treating raw water from reservoirs, lakes, or streams to render it fit for human consumption, the said water containing microorganisms and naturally occurring organic substances known to react with chlorine to yield one or more halogenated organic compounds, which method comprises the steps of subjecting the raw water to treatment to remove particulate matter therefrom prior to adding chlorine, adding from about 4 to about 8 p.p.m. of chlorine to the water to kill said microorganisms, holding the chlorine-containing water at a temperature between about 10° and about 50° C. and a pH between about 8.5 and about 9 for a period of about 3 to about 12 hours, to react said chlorine with said naturally occurring organic substances and produce said halogenated organic compounds, and thereafter passing air through a turbulent body of said water until said halogenated organic compounds are volatilized therefrom.

* * * * *

UNITED STATES PATENT AND TRADEMARK OFFICE
CERTIFICATE OF CORRECTION

PATENT NO. : 4,314,906
DATED : February 9, 1982
INVENTOR(S) : Howard E. Dunn et al It is certified that error appears in the above-identified patent and that said Letters Patent is hereby corrected as shown below:

Column 2, line 23, change "to" to --and--.

Column 4, line 2, change "complete" to --compete--.

Column 7, line 23, before "aeration" insert --an--.

Signed and Sealed this

Fourteenth Day of September 1982

[SEAL]

Attest:

GERALD J. MOSSINGHOFF

Attesting Officer  Commissioner of Patents and Trademarks